(No Model.)

S. E. A. PALMER.
CULTIVATOR AND WEED CUTTER.

No. 314,873. Patented Mar. 31, 1885.

WITNESSES
Villette Anderson.
John T. Morrow

INVENTOR
Seth E. A. Palmer,
by Anderson & Smith
his ATTORNEYS

N. PETERS, Photo-Lithographer, Washington, D. C.

UNITED STATES PATENT OFFICE.

SETH ETHAN ALLEN PALMER, OF SAN BERNARDINO, CALIFORNIA.

CULTIVATOR AND WEED-CUTTER.

SPECIFICATION forming part of Letters Patent No. 314,873, dated March 31, 1885.

Application filed September 8, 1883. (No model.)

*To all whom it may concern:*

Be it known that I, SETH E. A. PALMER, a citizen of the United States, residing at San Bernardino, in the county of San Bernardino and State of California, have invented certain new and useful Improvements in Cultivators and Weed-Cutters; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
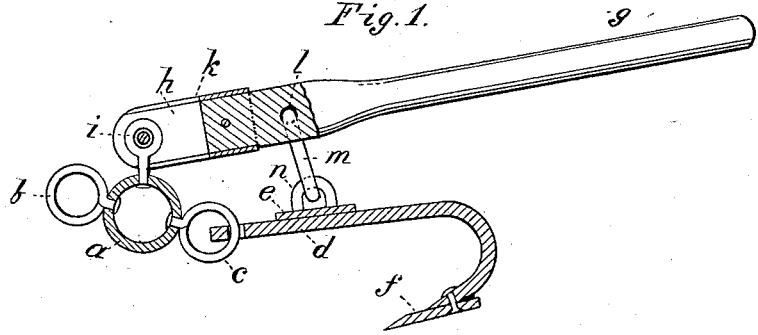
Figure 2:
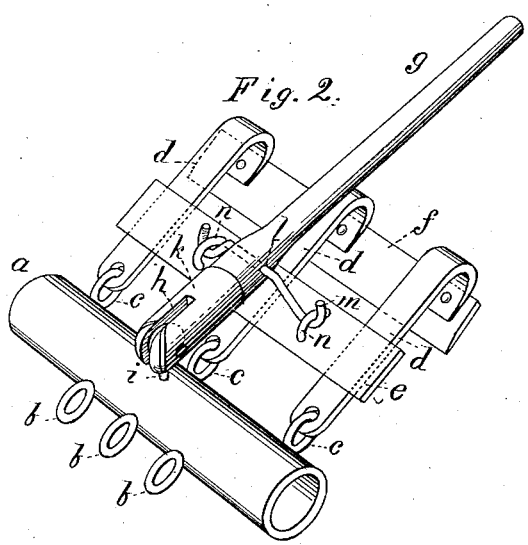

Figure 1 of the drawings is a representation of this invention, and is a vertical section. Fig. 2 is a perspective view as seen nearly on top.

This invention has relation to cultivators and weed-cutters; and it consists in the construction and novel arrangement of parts, as will be hereinafter fully described, and particularly pointed out in the claim appended.

Referring by letter to the accompanying drawings, $a$ designates the cross-beam of my improved cultivator or weed-cutter, which is preferably made of tubular iron and without wheels, in order that it may be easily drawn over the ground. I may, however, mount the cross-beam on wheels without departing from the character of the invention.

To the front side of the cross-beam $a$ are secured attaching lugs or eyes $b$, by which to fasten a tongue, thills, or stretchers for hitching the horses, mules, or cattle to the implement. On the rear side of the cross-beam are three or more eyes or lugs, $c$, to which the curved longitudinal knife-bars $d$ are hinged. These knife-bars $d$ are connected by a transverse connecting-bar, $e$, in rear of their hinge-joints, and are at their rear ends curved downwardly and rearwardly and then forwardly, as shown in the drawings. The knife $f$, which is made of spring-steel, is from one-fourth to three-eighths inch thick, two to three inches wide, and six to nine feet long, and is secured to the under faces of the knife-bars $d$ by bolts, so that its cutting-edge will project forward of the points of the said bars $d$. The forward end of the cultivator-handle $g$ is bifurcated at $h$, and hinged to an eye, $i$, projecting from the top of the cross-beam $a$. The handle $g$ is of wood, strengthened by a bifurcated casting, $k$, at its forward end, and is perforated laterally at $l$ to receive the central portion of a double hook, $m$, the arms of which engage eyes $n\,n$ on the transverse connecting-bar $e$. The knife takes the place of the independent cutting-teeth commonly used. The hinged knife-bars $d$ permit a vertical motion of the knife, the handle being used to manipulate the implement.

The implement is cheap, simple, and durable, and may be easily kept in order and effectively used as a cultivator or weed-cutter.

I am aware that it is not new in weed-cutters to provide the forward end of a frame with one or more wheels, and the rear portion thereof with a transverse inclined cutter adjustably connected to the said frame, and that clod-crushers composed of cylindrical bars have had cutting points or blades extending from their inner sides, and therefore do not claim such devices, broadly.

Having thus fully described my invention, what I claim as new, and desire to secure by Letters Patent, is—

The improved weed-cutter or cultivator herein described, consisting, essentially, of the tubular cross-beam $a$, carrying the front and rear eyes, $b$ and $c$, and the rearwardly-extending knife-bars $d$, secured at the forward ends to the eyes $c$ of the tubular cross-beam, and at the rear curved ends to the transverse bar $e$, connecting the knife-bars and carrying the eyes $n$ to receive the ends of the hooks $m$, which hook has its bearing in a lateral perforation in the handle $g$, which is hinged at its forward end to the said tubular cross-beam $a$, the whole adapted to operate substantially as and for the purposes specified.

In testimony whereof I affix my signature in presence of two witnesses.

SETH ETHAN ALLEN PALMER.

Witnesses:
JAS. A. GIBSON,
JOHN L. CAMPBELL.